(12) United States Patent
Raj et al.

(10) Patent No.: US 8,954,718 B1
(45) Date of Patent: Feb. 10, 2015

(54) CACHING SYSTEM AND METHODS THEREOF FOR INITIALIZING VIRTUAL MACHINES

(75) Inventors: Bipul Raj, Bangalore (IN); Mandar D. Kulkarni, Bangalore (IN); Arjun Gopalan, Chennai (IN); Karthik Chandrasekaran, Bangalore (IN); Praseem Banzal, Indore (IN)

(73) Assignee: NetApp, Inc., Sunnyvale, CA (US)

( * ) Notice: Subject to any disclaimer, the term of this patent is extended or adjusted under 35 U.S.C. 154(b) by 276 days.

(21) Appl. No.: 13/595,506

(22) Filed: Aug. 27, 2012

(51) Int. Cl.
*G06F 9/24* (2006.01)
*G06F 15/177* (2006.01)

(52) U.S. Cl.
USPC .................................. 713/1; 713/2

(58) Field of Classification Search
USPC ........................................... 713/1, 2
See application file for complete search history.

(56) References Cited

U.S. PATENT DOCUMENTS

| | | | |
|---|---|---|---|
| 8,639,658 B1* | 1/2014 | Kumaresan | 707/609 |
| 8,671,082 B1* | 3/2014 | Yadav et al. | 707/692 |
| 2010/0088296 A1* | 4/2010 | Periyagaram et al. | 707/705 |
| 2011/0265083 A1* | 10/2011 | Davis | 718/1 |
| 2012/0005467 A1* | 1/2012 | Butler et al. | 713/2 |
| 2012/0330903 A1* | 12/2012 | Periyagaram et al. | 707/692 |

OTHER PUBLICATIONS

"How to Use IntelliCache with XenDesktop"; Citrix Knowledge Center; CTX129052; May 12, 2011; Citrix Systems, Inc.

\* cited by examiner

*Primary Examiner* — Vincent Tran
(74) *Attorney, Agent, or Firm* — Klein, O'Neill & Singh, LLP (57) ABSTRACT

Method and system for initializing a plurality of virtual machines sharing a physical storage unit managed by a storage system for storing a boot image used for initializing the plurality of virtual machines are provided. A data structure is maintained by a virtual machine monitor that manages the plurality of virtual machines. The data structure includes a file block number for accessing a boot image that can be used for initializing the plurality of virtual machines and a unique signature for the physical storage unit storing the boot image and a memory address of a cache memory where the boot image is stored after it is obtained from the storage system. The plurality of virtual machines is initialized using the boot image from the cached memory without having to obtain the boot image for each individual virtual machine except for a first virtual machine.

21 Claims, 8 Drawing Sheets

CACHING SYSTEM AND METHODS THEREOF FOR INITIALIZING VIRTUAL MACHINES

TECHNICAL FIELD

The present disclosure relates to storage systems and virtual machines.

BACKGROUND

Various forms of storage systems are used today. These forms include direct attached storage (DAS) network attached storage (NAS) systems, storage area networks (SANs), and others. Network storage systems are commonly used for a variety of purposes, such as providing multiple users with access to shared data, backing up data and others.

A storage system typically includes at least one computing system executing a storage operating system for storing and retrieving data on behalf of one or more client computing systems ("clients"). The storage operating system stores and manages shared data containers in a set of mass storage devices.

Storage systems are being used extensively in virtual machine environments where a physical resource is time-shared among a plurality of independently operating processor executable virtual machines. Typically, storage space is presented to a virtual machine as a virtual hard disk (VHD) file by a virtualization layer. A storage drive (for example, C:\) is then presented to a user via a user interface within a virtual machine context. The user can use the storage drive to access storage space to read and write information.

Often a plurality of virtual machines may be cloned from a master virtual machine. When the virtual machines are cloned from the master virtual machine, they may share the same physical storage blocks to store a boot image to initialize the virtual machines. The storage operating system maintains separate distinct logical numbers (or file block numbers) for each cloned virtual machine to access the boot image stored at the shared physical storage blocks.

Even though the physical storage blocks may be shared, in conventional systems, the virtualization layer has to obtain a same boot image from the storage system every time a request to initialize a virtual machine is received. When a plurality of virtual machines has to be initialized at a same time, the virtualization layer and the storage system may get overloaded, often in sending and receiving the same boot image. The network supporting the virtual machines and the storage system may also get overloaded because of sending and receiving the same boot image. Continuous efforts are being made to initialize a plurality of virtual machines that may share the same physical storage for storing the same boot image without overloading the network infrastructure including the virtualization layer and the storage system.

SUMMARY

In one embodiment, a method and system for initializing a plurality of virtual machines sharing a physical storage unit managed by a storage system are provided. A boot image includes instructions that may be used by a computing system to initialize the plurality of virtual machines. A data structure is maintained by a virtual machine monitor that manages the plurality of virtual machines. The data structure includes a file block number for accessing a boot image that can be used for initializing the plurality of virtual machines; a unique signature for the physical storage unit storing the boot image and a memory address of a cache memory where the boot image is stored after it is obtained from the storage system. The plurality of virtual machines is initialized using the boot image from the cached memory without having to obtain the boot image for each individual virtual machine except for a first virtual machine from among a plurality of virtual machines.

In another embodiment, a machine implemented method for initializing a plurality of virtual machines sharing a physical storage unit managed by a storage system for storing a boot image used for initializing the plurality of virtual machines is provided. The method includes obtaining a file block number and a unique signature for the physical storage unit storing the boot image for a first virtual machine from among the plurality of virtual machines; obtaining the boot image from the storage system managing the physical storage unit; storing the boot image at a cache memory of a virtual machine monitor that manages the plurality of virtual machines; and initializing the first virtual machine using the boot image.

The method further includes generating a first data structure for storing the file block number and the unique signature; generating a second data structure for storing the unique signature and a memory address of the cache memory where the boot image is stored; obtaining file block numbers for remaining plurality of virtual machines besides the first virtual machine; updating the first data structure with the file block numbers for the remaining plurality of virtual machines and the unique signature; using the unique signature to obtain the address of the boot image stored at the cache memory for initializing the remaining plurality of virtual machines; and initializing the remaining plurality of virtual machines using the boot image from the cached memory.

In yet another embodiment, a machine implemented method for initializing a plurality of virtual machines sharing a physical storage unit managed by a storage system for storing a boot image used for initializing the plurality of virtual machines is provided. The method includes maintaining a data structure by a virtual machine monitor that manages the plurality of virtual machines, the data structure includes a file block number for accessing the boot image for initializing the plurality of virtual machines; a unique signature for the physical storage unit storing the boot image and a memory address of a cache memory where the boot image is stored after it is obtained from the storage system; and initializing the plurality of virtual machines using the boot image from the cached memory without having to obtain a boot image from the storage system for each individual virtual machine except for a first virtual machine from among the plurality of virtual machines.

In another embodiment, a system is provided. The system includes a plurality of virtual machines managed by a virtualized machine monitor and sharing a physical storage unit for storing a boot image used for initializing the plurality of virtual machines; and a storage system managing the physical storage unit and interfacing with the virtual machine monitor via a network link.

To initialize a first virtual machine from among the plurality of virtual machines, the virtual machine monitor is configured to obtain a file block number, a unique signature for the physical storage unit and the boot image from the storage system; store the boot image at a cache memory of the virtual machine monitor; generate a first data structure for storing the file block number and the unique signature; and generate a second data structure for storing the unique signature and a memory address of the cache memory where the boot image is stored.

To initialize a remaining plurality of virtual machines besides the first virtual machine, the virtual machine monitor is configured to obtain file block numbers for the remaining plurality of virtual machines; update the first data structure with the file block numbers for the remaining plurality of virtual machines and the unique signature; use the unique signature to obtain the address of the boot image stored at the cache memory for initializing the remaining plurality of virtual machines; and initialize the remaining plurality of virtual machines using the boot image from the cached memory.

This brief summary has been provided so that the nature of this disclosure may be understood quickly. A more complete understanding of the disclosure can be obtained by reference to the following detailed description of the various embodiments thereof in connection with the attached drawings.

BRIEF DESCRIPTION OF THE DRAWINGS

The foregoing features and other features will now be described with reference to the drawings of the various embodiments. In the drawings, the same components have the same reference numerals. The illustrated embodiments are intended to illustrate, but not to limit the present disclosure. The drawings include the following Figures.

DETAILED DESCRIPTION

As preliminary note, the terms "component", "module", "system," and the like as used herein are intended to refer to a computer-related entity, either software-executing general purpose processor, hardware, firmware and a combination thereof. For example, a component may be, but is not limited to being, a process running on a processor, a hardware based processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, at non-transitory, computer readable media including, but not limited to, an ASIC (application specific integrated circuit), CD (compact disc), DVD (digital video disk), ROM (read only memory), floppy disk, hard disk, EEPROM (electrically erasable programmable read only memory), memory stick or any other storage device, in accordance with the claimed subject matter.

In one embodiment, a method and system for initializing a plurality of virtual machines (VMs) sharing a physical storage unit managed by a storage system are provided. A boot image includes processor instructions that may be used by a computing system to initialize the plurality of VMs. A data structure is maintained by a virtual machine monitor that manages the plurality of VMs. The data structure includes a file block number for accessing a boot image that can be used for initializing the plurality of VMs; a unique signature for the physical storage unit storing the boot image and a memory address of a cache memory where the boot image is stored after it is obtained from the storage system. The VMs are initialized using the boot image from the cached memory without having to obtain the boot image for each individual VM except for a first VM from among the plurality of VMs.

Figure 1A:
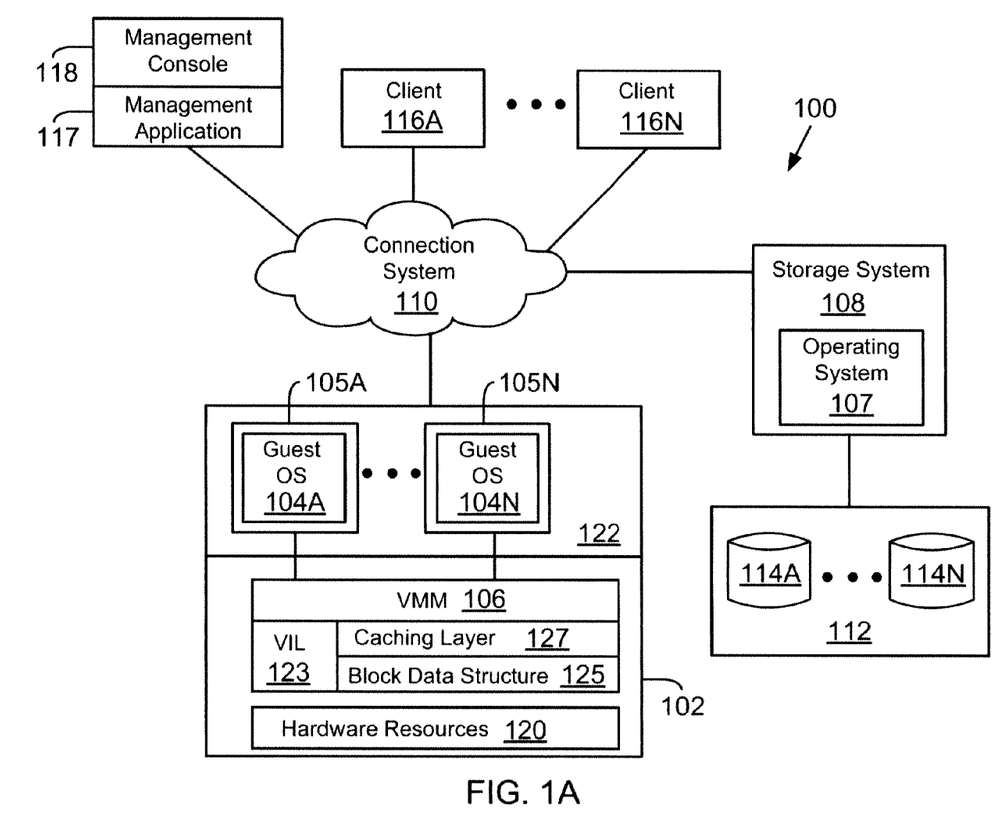
FIG. 1A shows an example of an operating environment for the various embodiments disclosed herein.

System 100:

FIG. 1A shows an example of a system 100, where adaptive embodiments disclosed herein may be implemented. System 100 includes a virtual machine environment where a physical resource is time-shared among a plurality of independently operating processor executable VMs. Each VM may function as a self-contained platform, running its own operating system (OS) and computer executable, application software. The computer executable instructions running in a VM may be collectively referred to herein as "guest software." In addition, resources available within the VM may be referred to herein as "guest resources."

The guest software expects to operate as if it were running on a dedicated computer rather than in a VM. That is, the guest software expects to control various events and have access to hardware resources on a physical computing system (may also be referred to as a host platform) which maybe referred to herein as "host hardware resources". The host hardware resource may include one or more processors, resources resident on the processors (e.g., control registers, caches and others), memory (instructions residing in memory, e.g., descriptor tables), and other resources (e.g., input/output devices, host attached storage, network attached storage or other like storage) that reside in a physical machine or are coupled to the host platform.

In one embodiment, system 100 includes at least a computing system 102 (may also be referred to as a host platform 102 or server 102) communicably coupled to a storage system 108 executing a storage operating system 107 via a connection system 110 such as a local area network (LAN), wide area network (WAN), the Internet and others. As described herein, the term "communicably coupled" may refer to a direct connection, a network connection, or other connections to enable communication between devices.

System 100 may also include a management console 118 that executes processor executable instructions, for example, a management application 117 for managing and configuring various elements of system 100. One or more client computing systems 116A-116N (may also be referred to as client system 116) may also be provided for accessing the VMs described below in detail.

Host platform 102, management console 118 and client system 116 may be general purpose computers having a plurality of components. As described below in more detail, these components may include a central processing unit (CPU), main memory, I/O devices, and storage devices (for example, flash memory, hard drives and others). The main memory may be coupled to the CPU via a system bus or a local memory bus. The main memory may be used to provide the CPU access to data and/or program information that is stored in main memory at execution time. Typically, the main memory is composed of random access memory (RAM) circuits.

In one embodiment, the storage system 108 has access to a set of mass storage devices 114A-114N (may be referred to as storage devices 114) within at least one storage subsystem 112. The storage devices 114 may include writable storage device media such as magnetic disks, video tape, optical, DVD, magnetic tape, non-volatile memory devices for example, self-encrypting drives, flash memory devices and any other similar media adapted to store structured or non-structured data. The storage devices 114 may be organized as one or more groups of Redundant Array of Independent (or Inexpensive) Disks (RAID). The embodiments disclosed are not limited to any particular storage device or storage device configuration.

The storage system 108 provides a set of storage volumes to the host platform 102 via connection system 110. The storage operating system 107 can present or export data stored at storage devices 114 as a volume. Each volume may be configured to store data files (or data containers or data objects), scripts, word processing documents, executable programs, and any other type of structured or unstructured data. From the perspective of one of the client systems, each volume can appear to be a single disk drive. However, each volume can represent the storage space in one storage device, an aggregate of some or all of the storage space in multiple storage devices, a RAID group, or any other suitable set of storage space. An aggregate is typically managed by storage operating system 107 and identified by a unique identifier (not shown). It is noteworthy that the term "disk" as used herein is intended to mean any storage device/space and not to limit the adaptive embodiments to any particular type of storage device, for example, hard disks.

The storage system 108 may be used to store and manage information at storage devices 114 based on a request generated by a management console 118, client system 116 and/or a VM. The request may be based on file-based access protocols, for example, the Common Internet File System (CIFS) protocol or Network File System (NFS) protocol, over the Transmission Control Protocol/Internet Protocol (TCP/IP). Alternatively, the request may use block-based access protocols, for example, the Small Computer Systems Interface (SCSI) protocol encapsulated over TCP (iSCSI) and SCSI encapsulated over Fibre Channel (FC).

In a typical mode of operation, one or more input/output (I/O) commands, such as an NFS or CIFS request, is sent over connection system 110 to the storage system 108. Storage system 108 receives the request, issues one or more I/O commands to storage devices 114 to read or write the data on behalf of the client system, and issues an NFS or CIFS response containing the requested data over the network 110 to the respective client system.

Although storage system 108 is shown as a stand-alone system, i.e. a non-cluster based system, in another embodiment, storage system 108 may have a distributed architecture; for example, a cluster based system that may include a separate N-("network") blade and D-(disk) blade. Briefly, the N-blade is used to communicate with host platform 102 and clients 116, while the D-blade is used to communicate with the storage devices 114 that are a part of a storage subsystem. The N-blade and D-blade may communicate with each other using an internal protocol.

Alternatively, storage system 108 may have an integrated architecture, where the network and data components are included within a single chassis. The storage system 108 further may be coupled through a switching fabric to other similar storage systems (not shown) which have their own local storage subsystems. In this way, all of the storage subsystems can form a single storage pool, to which any client of any of the storage servers has access.

Host platform 102 provides a processor executable virtual machine environment 122 executing a plurality of VMs 105A-105N. VMs 105A-105N execute a plurality of guest OS 104A-104N (may also be referred to as guest OS 104) that share hardware resources 120. As described above, hardware resources 120 may include CPU, memory, I/O devices, storage or any other hardware resource.

In one embodiment, host platform 102 may also include a virtual machine monitor (VMM) 106, for example, a processor executed hypervisor layer provided by VMWare Inc., Hyper-V layer provided by Microsoft Corporation of Redmond, Wash. or any other layer type. VMM 106 presents and manages the plurality of guest OS 104A-104N executed by the host platform 102.

In one embodiment, VMM 106 is executed by host platform 102 with VMs 105A-105N. In another embodiment, VMM 106 may be executed by an independent stand-alone computing system, often referred to as a hypervisor server or VMM server and VMs 105A-105N are presented on another computing system. It is noteworthy that various vendors provide virtualization environments, for example, VMware Corporation, Microsoft Corporation and others. The generic virtualization environment described above with respect to FIG. 1A may be customized depending on the virtual environment provider.

The VMM 106 may include or interface with a virtualization layer (VIL) 123 that provides one or more virtualized hardware resource to each OS 104A-104N. VIL 123 may include a caching layer 127, according to one embodiment.

The caching layer 127 may store a plurality of data structures, for example, a block data structure 125 that may be used for initializing a plurality of VMs as described below in more detail. The block data structure 125 may be stored at a memory device (or cache memory) accessible to VIL 123 and its components, for example, caching layer 127.

Figure 1B:
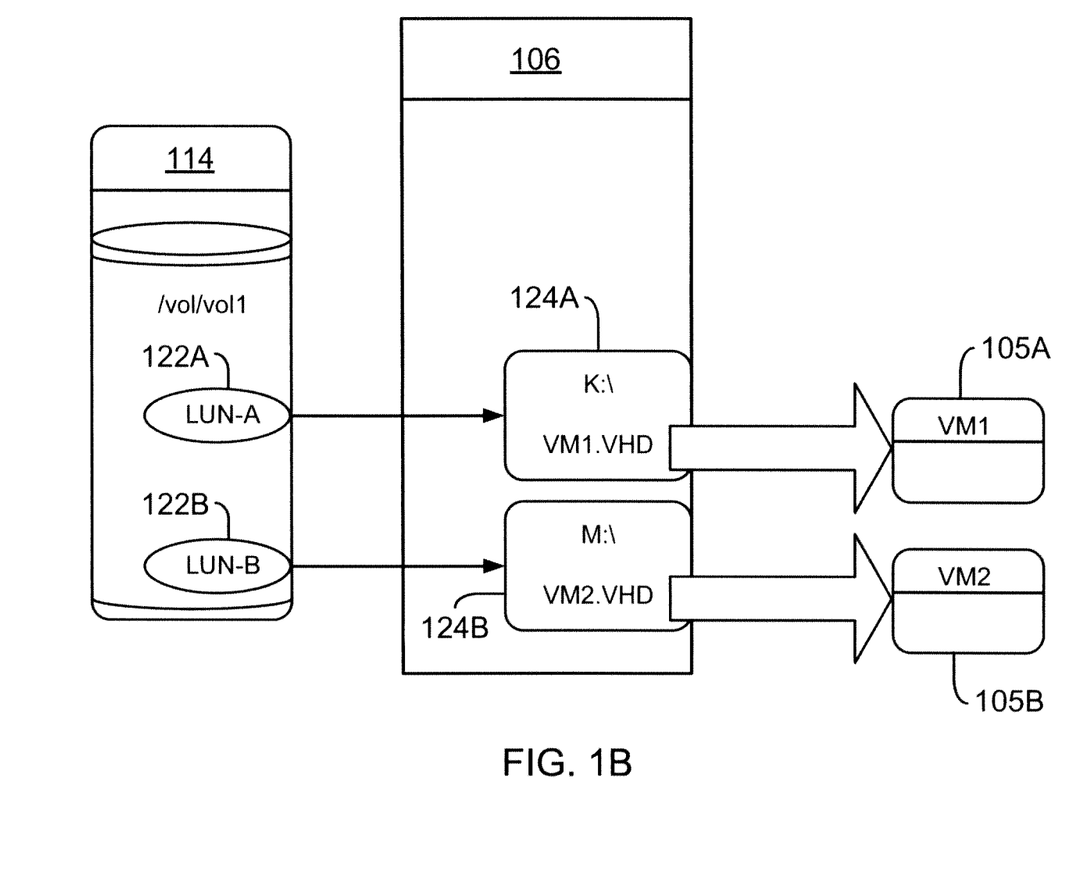
FIG. 1B shows an example of presenting storage space to a virtual machine, according to one embodiment.

Before describing the details of block data structure 125 and how it is used, the following provides an example of presenting logical storage space to one or more VMs with respect to FIG. 1B. Storage system 108 typically presents storage space at storage device 114 as a logical unit number (LUN) to VMM 106. For example, LUN-A 122A and LUN-B 122B at storage device 114 for volume "vol1" are presented to VMM 106 that hosts a plurality of VMs 105A (VM1)-105B (VM2).

VMM 106 then creates a file system for example, a NTFS file system (used in a Windows® operating system environment) on the LUNs and generates one or more virtual hard drive (VHD) files for each LUN. The user is presented with a storage drive within a virtual machine. For example, the VHD file VM1.VHD 124A is created on LUN-A 122A and then presented as drive K:\ to VM1 105A. A user using VM1 105A uses K:\ to access storage space for reading and writing information. Similarly, VM2.VHD 124B is created on LUN-B 122B and appears as M:\ drive for VM2 105B. A user using VM2 105A uses M:\ drive to store information.

In some instances, VMM 106 does not create a file system for the LUNs and instead the LUNs are presented directly to the VM as a storage drive. The storage drives in such an instance may be referred to as "pass through" disks. The terms VHD and pass through disks as used herein for presenting a virtual storage drive to a user via a VM are used interchangeably throughout this specification.

Figure 1C:
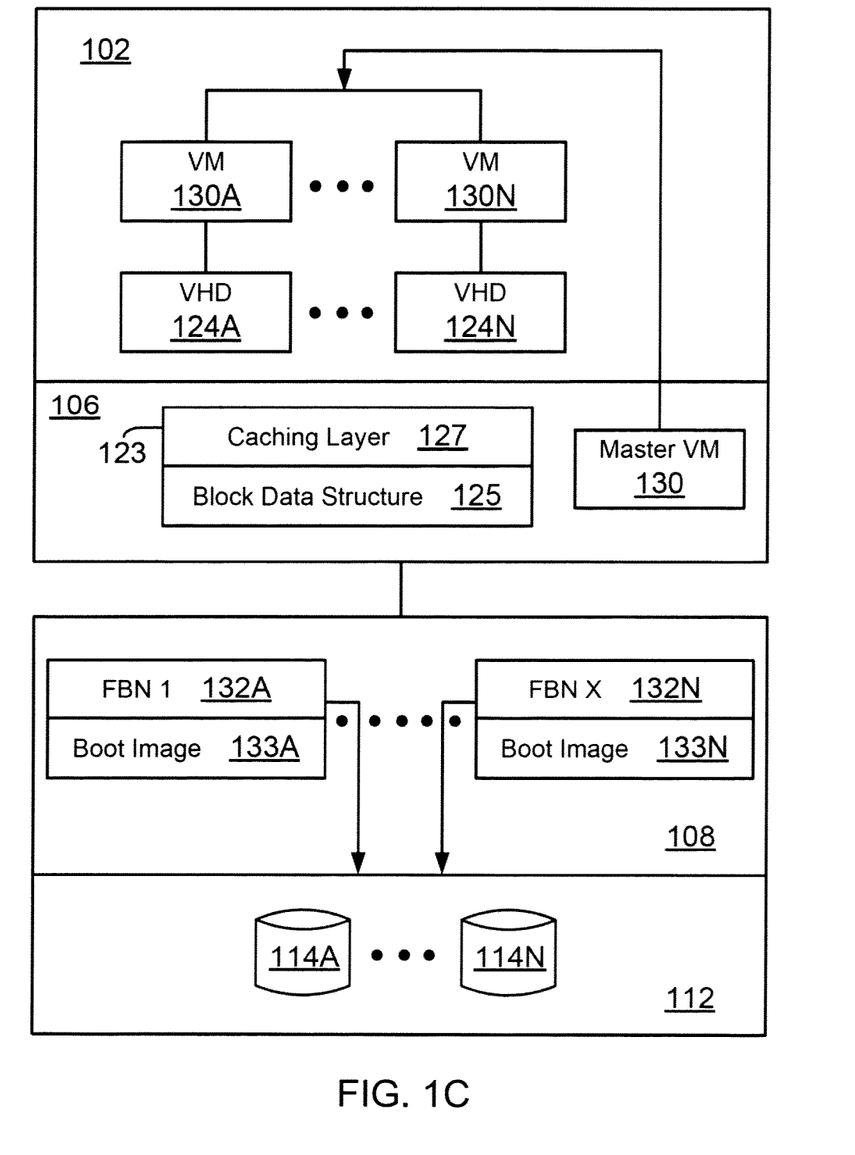
FIG. 1C shows an example of using cloned VMs, according to one embodiment.

FIG. 1C shows a block diagram of presenting cloned VMs, according to one embodiment. In one embodiment, a master VM 130 is maintained by VMM 106 and then a cloned version of the master VM 130 is made available as VMs 130A-130N to host system 102. Each cloned VM 130A-130N is presented storage space as a VHD, shown as 124A-124N.

The storage system 108 maintains a file block number (FBN) (may also be referred to as a logical number for accessing data) 132A-132N for storing the boot image 133A-133N that is used for initializing each VM 130A-130N. The FBN's however share the same physical storage units (for example, blocks) at storage device 114A-114N where the boot image for the cloned VMs is stored. One reason for sharing the same physical storage units is that when the cloned VMs are generated, the same boot image may be used to initialize the cloned VMs. The term boot image as used throughout this disclosure means instructions for initializing a virtual machine that are stored at one or more physical storage blocks and accessible to VMM 106 using one or more FBNs that are maintained by storage operating system 107.

In one embodiment, storage operating system 107 uses blocks (for example, 4 k in size) as storage units to manage the physical storage space at storage devices 114A-114N. Each physical block within storage device 114A-114N can be uniquely identified by using a unique identifier. The unique identifier may be called a physical block number (PVBN) that is maintained by storage operating system 107 to manage the physical storage. Each block also belongs to an aggregate that is also identified by a unique identifier and maintained by storage operating system 107. Thus the aggregate identifier and the PVBN may be considered as a unique block signature for identifying a storage block within storage devices 114A-114N. Storage operating system 107 maintains a mapping for each VM/FBN/block location where the boot image 133A/133N is stored.

In a conventional system, to boot (or initialize) a plurality of VMs, VMM 106 first obtains the boot image associated with each VM from storage system 108. This involves requesting the boot image, reading the blocks at storage devices 114, providing the boot images to VMM 106 and then initializing the VMs. This approach may be acceptable when there are a limited number of VMs or if the VMs are not sharing the same physical storage blocks for storing the same boot image for each VM. However, in a system using a large number of VMs, for example, over 50, and if all the VMs request initialization (or booting) at the same time (may be referred to as a "boot storm"), then VMM 106 may not be able to initialize the VMs within a desirable time frame because of the various steps described above for obtaining the boot image for each VM. The embodiments disclosed herein provide a method and system for initializing cloned VMs during a boot storm without having to obtain the boot image for every cloned VM.

Figure 1D:
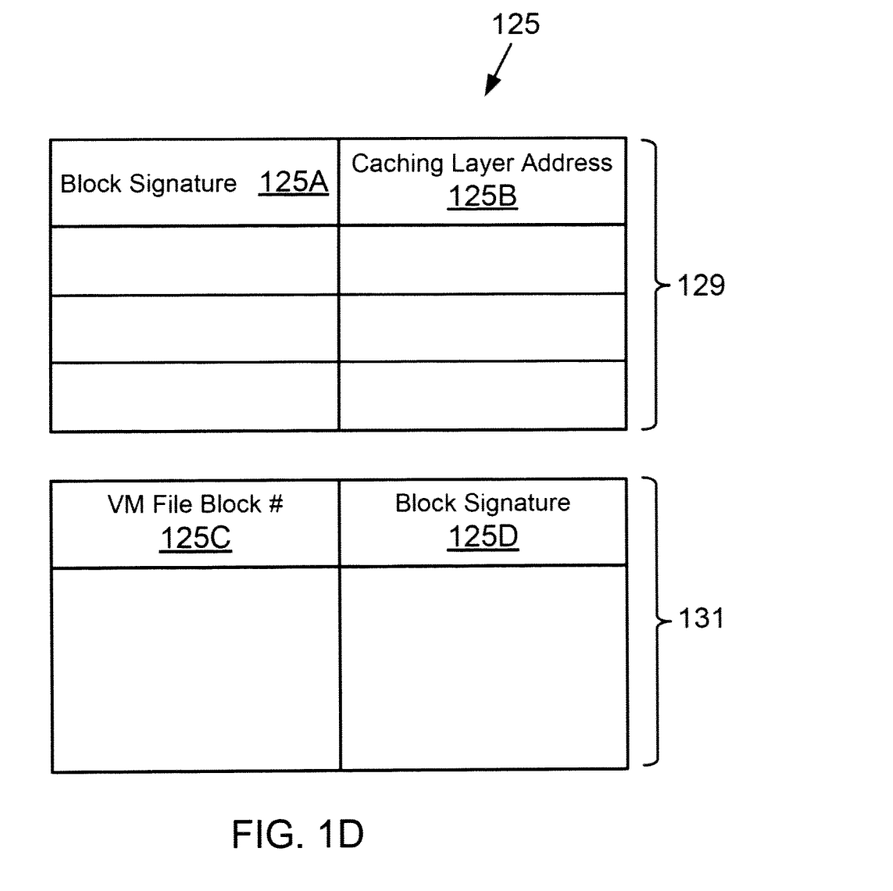
FIG. 1D shows an example of a data structure according to one embodiment.

FIG. 1D shows details of block data structure 125, according to one embodiment. Block data structure may include a first segment 129 having fields 125A and 125B and a second segment 131 with fields 125C and 125D that are described below. It is noteworthy that the data structure 125 may be implemented as an integrated searchable data structure with segments 129 and 131 or separate data structures where each segment 129 and 131 operates as an independent searchable data structure.

Field 125A stores a block signature that identifies a block that is read to obtain the boot image. The block signature is associated with field 125B, which includes a caching layer block address of a memory location used by the caching layer 127 to store a boot image for a VM after the boot image is read from a block of storage device 114 and provided to caching layer 127 by storage operating system 107. The block signature 125A includes the aggregate UUID (universal unique identifier) and a PVBN maintained by the storage operating system 107 and provided to VIL 123. Using the block signature, VIL 123 can obtain the memory address to read the boot image from the caching layer 127 to boot a VM, without having to request the storage system 108 for the boot image.

Field 125C includes a FBN to access the boot image for each cloned VM that requests initialization. Field 125D includes the block signature of a block that maps to the FBN of field 125C and is used to store a boot image (or a portion thereof) for a cloned VM. It is noteworthy that the block signature associated with different FBNs may be the same for each cloned VMs, unless the boot image of a specific cloned VM has been changed, after the VM was cloned from the master VM 130.

Figure 1E:
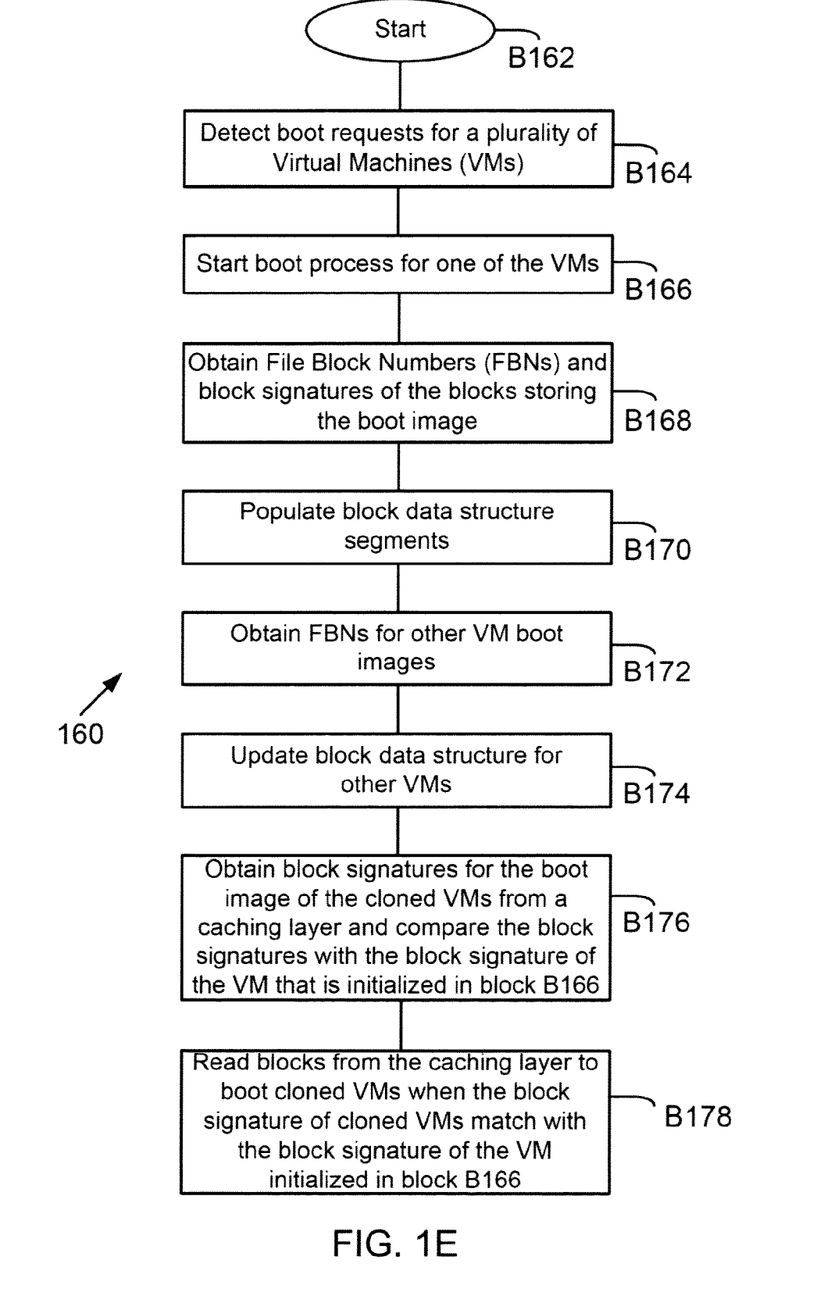
FIG. 1E shows a process flow diagram for initializing a plurality of VMs, according to one embodiment.

FIG. 1E shows a process flow 160 for initializing a plurality of cloned VMs during a boot storm, according to one embodiment. The process starts in block 3162. In block 3164, VIL 123 detects multiple requests for booting the plurality of cloned VMs 130A-130N. The requests are detected by VIL 123 because VMM 106 manages and presents all the cloned VMs 130A-130N. The boot images for each cloned image share the same physical blocks at storage device 114, as described above. It is noteworthy that boot requests from VMs that are not cloned or that do not share the same physical blocks for storing the boot image are processed by individually obtaining the boot image for each VM.

In block B166, the boot process begins for one of the cloned VMs, for example, VM 130A. As part of the boot process, in block B168, the various FBNs 132A for booting VM 130A are obtained from storage operating system 107 with the boot image 133A. The block signatures of the physical blocks (i.e. aggregate UUID and the PVBN) for the blocks that store the boot image 133A are also obtained from storage operating system 107 in a batch operation. The block signatures and the FBN are then used to populate segment 131 of block data structure 125 in block B170. The boot image is stored by caching layer 127 at a memory cache maintained by caching layer 127. Thereafter, segment 129 of block data structure is also populated with the VIL block address 125B and the block signature 125A. It is noteworthy that a lock is placed on the boot image that is stored (or cached) at the memory cache of the caching layer 127. The lock is placed so that the cached boot image does not get evicted from the memory cache until the VM is initialized.

For booting other cloned VMs, in block B172, the FBNs for the boot image of the other cloned VMs are obtained by VIL 123 from storage operating system 107. In one embodiment, all the FBNs may be obtained as part of a batch process. This optimizes block B172 because VIL 123 does not have to obtain the FBNs in multiple transactions. Thereafter, the data structure 125 is updated in block B174. During the update process, field 125C is updated with the FBN for each cloned VM and field 125D is updated with the block signature 125D associated with the FBN for each cloned VM.

In block B176, the block signature for the boot image of each cloned VM is obtained from segment 131. The block signature for each cloned VM is compared with the block signature of the boot image 133A for VM 130A. If the block signature of other cloned VMs match with the block signature of VM 130A, then the block signature for VM 130A is used in block B178 to obtain the memory address from segment 129.

The boot image 133A is read from the caching layer 127 and is then used to boot the other cloned VMs with the matching block signatures. Once the VMs are initialized, one does not need to maintain the entire data structure 125 and segment 131 is cleared. This optimizes the use of cache memory used by caching layer 127.

It is noteworthy that a boot image for the VMS may include several blocks and each block may have its own unique signature. If the block signature for certain blocks of the boot image of any VM does not match with the block signature of the blocks of the boot image of VM 130A, then the blocks whose signature does not match are not read from the caching layer 127 and instead, those blocks are obtained from the storage operating system 107.

The process described above has advantages over conventional systems because VMM 106 does not have to obtain the same boot image from the same physical storage blocks to boot a plurality of cloned VMs. This reduces traffic for the network infrastructure because the number of transactions to acquire the boot image for the cloned VMs is reduced. This is also efficient for VMM 106 and storage operating system 107 because VMM 106 does not have to keep asking for the same boot image and the storage operating system 107 does not have to keep sending the same boot image.

Figure 2:
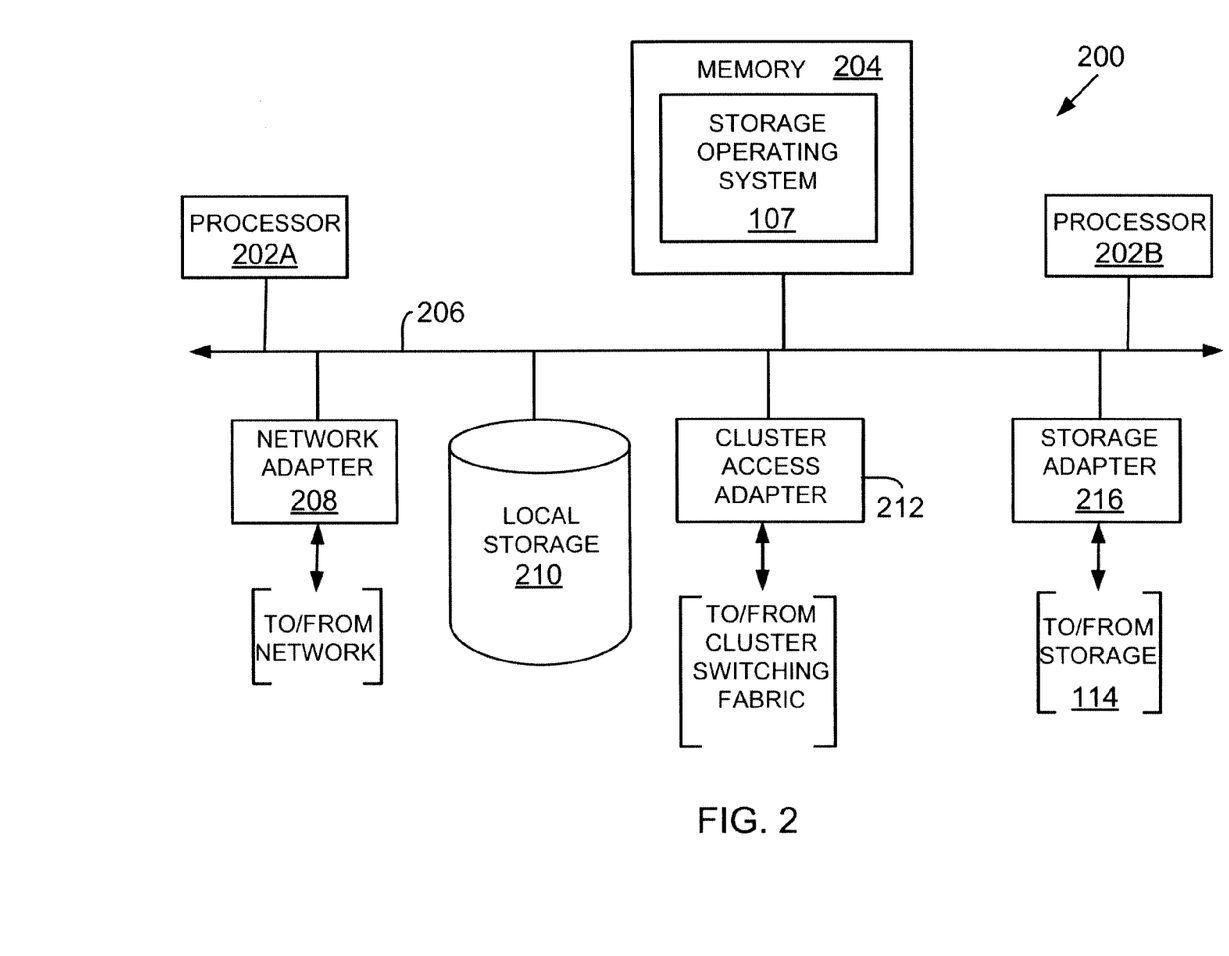
FIG. 2 shows an example of a storage system, used according to one embodiment.

Storage System:

FIG. 2 is a block diagram of a system 200, according to one embodiment. System 200 may be used by a stand-alone storage system 108 and/or a storage system node operating within a cluster. System 200 executes storage operating system 107 that maintains FBNs 132A-132N (FIG. 1C) and manages the storage blocks at storage devices 114A-114N that store the boot image 133A-133N for cloned VMs 130A-130N, described above in detail.

System 200 may include a plurality of processors 202A and 202B, a memory 204, a network adapter 208, a cluster access adapter 212 (used for a cluster environment), a storage adapter 216 and local storage 210 interconnected by a system bus 206. The local storage 210 comprises one or more storage devices, such as disks, utilized by the processors to locally store configuration and other information.

The cluster access adapter 212 comprises a plurality of ports adapted to couple system 200 to other nodes of a cluster (not shown). In the illustrative embodiment, Ethernet may be used as the clustering protocol and interconnect media, although it will be apparent to those skilled in the art that other types of protocols and interconnects may be utilized within the cluster architecture described herein.

System 200 is illustratively embodied as a dual processor storage system executing a storage operating system 107 that preferably implements a high-level module, such as a file system, to logically organize information as a hierarchical structure of named directories, files and special types of files called virtual disks on storage devices 114. However, it will be apparent to those of ordinary skill in the art that the system 200 may alternatively comprise a single or more than two processor systems.

The memory 204 illustratively comprises storage locations that are addressable by the processors and adapters for storing programmable instructions and data structures. The processor and adapters may, in turn, comprise processing elements and/or logic circuitry configured to execute the programmable instructions and manipulate the data structures. It will be apparent to those skilled in the art that other processing and memory means, including various computer readable media, may be used for storing and executing program instructions pertaining to the invention described herein.

The storage operating system 107, portions of which is typically resident in memory and executed by the processing elements, functionally organizes the system 200 by, inter alia, invoking storage operations in support of the storage service provided by storage system 108. An example of operating system 107 is the DATA ONTAP® (Registered trademark of NetApp, Inc. operating system available from NetApp, Inc. that implements a Write Anywhere File Layout (WAFL® (Registered trademark of NetApp, Inc.)) file system. However, it is expressly contemplated that any appropriate storage operating system may be enhanced for use in accordance with the inventive principles described herein. As such, where the term "ONTAP" is employed, it should be taken broadly to refer to any storage operating system that is otherwise adaptable to the teachings of this invention.

The network adapter 208 comprises a plurality of ports adapted to couple the system 200 to one or more clients 116 over point-to-point links, wide area networks, virtual private networks implemented over a public network (Internet) or a shared local area network. The network adapter 208 thus may comprise the mechanical, electrical and signaling circuitry needed to connect storage system 108 to the network. Illustratively, the computer network 110 may be embodied as an Ethernet network or a FC network. The network adapter 208 may also be used to communicate with VMM 106 for exchanging FBN and boot signatures described above in detail.

The storage adapter 216 cooperates with the storage operating system 107 executing on the system 200 to access information requested by the clients and management application 118 (FIG. 1A). The information may be stored on any type of attached array of writable storage device media such as video tape, optical, DVD, magnetic tape, bubble memory, electronic random access memory, flash memory devices, micro-electro mechanical and any other similar media adapted to store information, including data and parity information.

The storage adapter 216 comprises a plurality of ports having input/output (I/O) interface circuitry that couples to the disks over an I/O interconnect arrangement, such as a conventional high-performance, FC link topology. Storage adapter 216 may be used to obtain boot image for the VMs from the storage device 114 as described above in detail.

In another embodiment, instead of using a separate network and storage adapter, a converged adapter is used to process both network and storage traffic. In this embodiment, the converged adapter may be used to communicate with storage device 114 and VMM 106.

Figure 3:
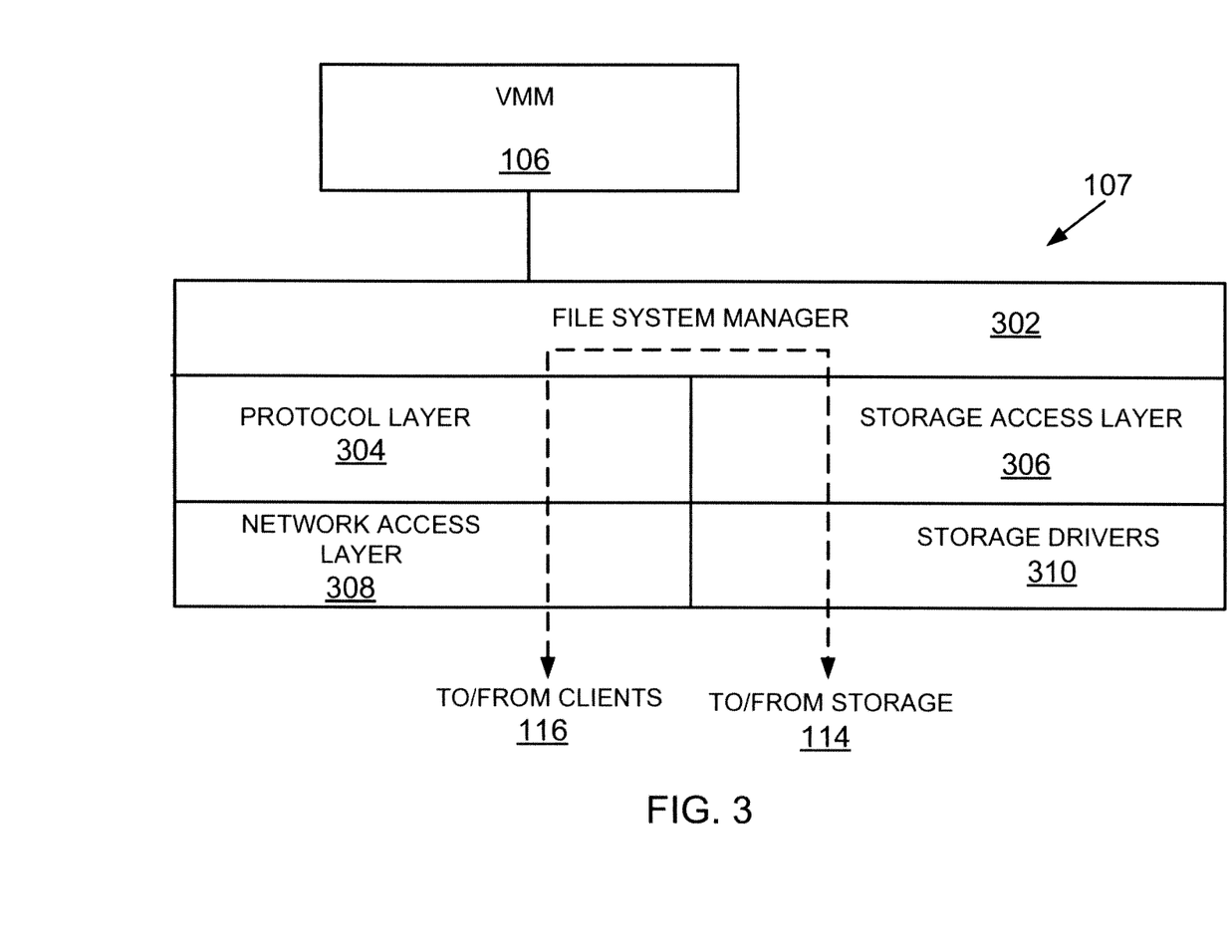
FIG. 3 shows an example of a storage operating system, used according to one embodiment.

Operating System:

FIG. 3 illustrates a generic example of operating system 107 executed by storage system 108, according to one embodiment of the present disclosure. Storage operating system 107 interfaces with VMM 106 for providing information to populate block data structure 125 and the boot image for booting the cloned VMs 130A-130N, described above in detail.

As an example, operating system 107 may include several modules, or "layers". These layers include a file system manager 302 that keeps track of a directory structure (hierarchy) of the data stored in storage devices and manages read/write operations, i.e. executes read/write operations on disks in response to client 116 requests.

Operating system 107 may also include a protocol layer 304 and an associated network access layer 308, to allow system 200 to communicate over a network with other systems, such as VMM 106. Protocol layer 304 may implement one or more of various higher-level network protocols, such as NFS, CIFS, Hypertext Transfer Protocol (HTTP), TCP/IP and others, as described below.

Network access layer 308 may include one or more drivers, which implement one or more lower-level protocols to communicate over the network, such as Ethernet. Interactions between VMs and mass storage devices 114 are illustrated schematically as a path, which illustrates the flow of data through operating system 107.

The operating system 107 may also include a storage access layer 306 and an associated storage driver layer 310 to communicate with a storage device. The storage access layer 306 may implement a higher-level disk storage protocol, such as RAID, while the storage driver layer 310 may implement a lower-level storage device access protocol, such as FC or SCSI.

It should be noted that the software "path" through the operating system layers described above needed to perform data storage access for a client request may alternatively be implemented in hardware. That is, in an alternate embodiment of the disclosure, the storage access request data path may be implemented as logic circuitry embodied within a field programmable gate array (FPGA) or an ASIC. This type of hardware implementation increases the performance of the file service provided by storage system 108 in response to a file system request issued by client 114.

As used herein, the term "storage operating system" generally refers to the computer-executable code operable on a computer to perform a storage function that manages data access and may, in the case of system 200, implement data access semantics of a general purpose operating system. The storage operating system can also be implemented as a microkernel, an application program operating over a general-purpose operating system, such as UNIX® or Windows XP, or as a general-purpose operating system with configurable functionality, which is configured for storage applications as described herein.

In addition, it will be understood to those skilled in the art that the invention described herein may apply to any type of special-purpose (e.g., file server, filer or storage serving appliance) or general-purpose computer, including a standalone computer or portion thereof, embodied as or including a storage system. Moreover, the teachings of this disclosure can be adapted to a variety of storage system architectures including, but not limited to, a network-attached storage environment, a storage area network and a disk assembly directly-attached to a client or host computer. The term "storage system" should therefore be taken broadly to include such arrangements in addition to any subsystems configured to perform a storage function and associated with other equipment or systems. It should be noted that while this description is written in terms of a write any where file system, the teachings of the present invention may be utilized with any suitable file system, including a write in place file system.

Figure 4:
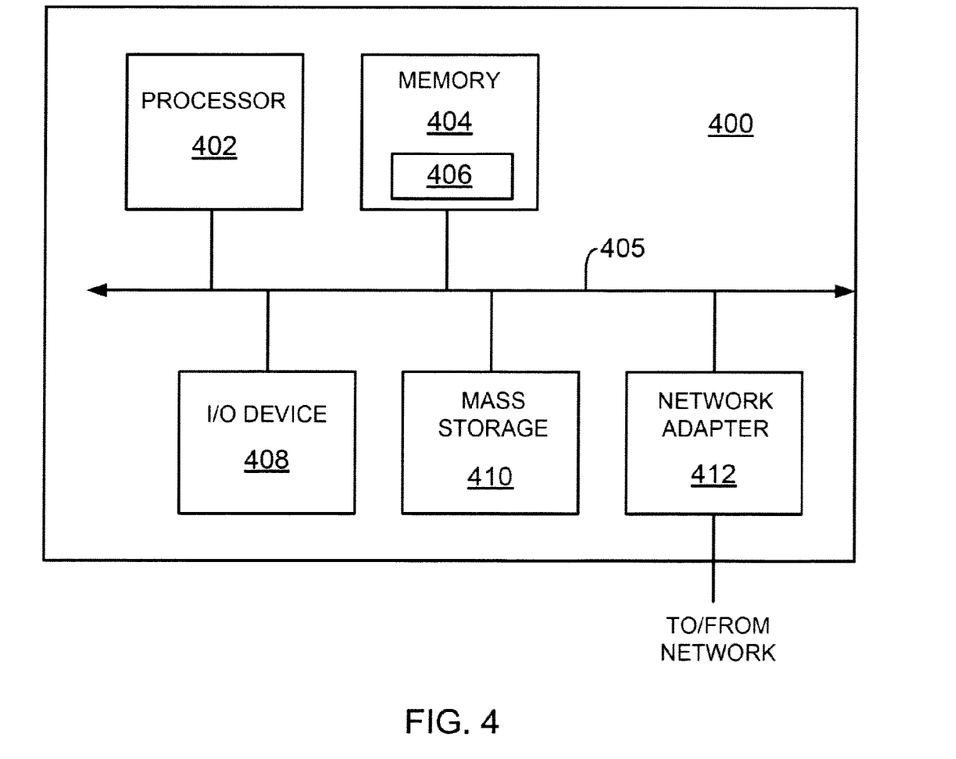
FIG. 4 shows an example of a processing system, used according to one embodiment.

Processing System:

FIG. 4 is a high-level block diagram showing an example of the architecture of a processing system, at a high level, in which executable instructions as described above can be implemented. The processing system 400 can represent host system 102, VMM 106, management console 118, clients 116 and others. Note that certain standard and well-known components which are not germane to the present invention are not shown in FIG. 4.

The processing system 400 includes one or more processors 402 and memory 404, coupled to a bus system 405. The bus system 405 shown in FIG. 4 is an abstraction that represents any one or more separate physical buses and/or point-to-point connections, connected by appropriate bridges, adapters and/or controllers. The bus system 405, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processors 402 are the central processing units (CPUs) of the processing system 400 and, thus, control its overall operation. In certain embodiments, the processors 402 accomplish this by executing programmable instructions stored in memory 404. A processor 402 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 404 represents any form of random access memory (RAM), read-only memory (ROM), flash memory, or the like, or a combination of such devices. Memory 404 includes the main memory of the processing system 400. Instructions 406 which implements techniques introduced above may reside in and may be executed (by processors 402) from memory 404. For example, instructions 406 may include code for executing process steps for FIG. 1E as well as storing the block data structure 125 described above in detail.

Also connected to the processors 402 through the bus system 405 are one or more internal mass storage devices 410, and a network adapter 412. Internal mass storage devices 410 may be or may include any conventional medium for storing large volumes of data in a non-volatile manner, such as one or more magnetic or optical based disks. The network adapter 412 provides the processing system 400 with the ability to communicate with remote devices (e.g., storage servers) over a network and may be, for example, an Ethernet adapter, a FC adapter, or the like. The processing system 400 also includes one or more input/output (I/O) devices 408 coupled to the bus system 405. The I/O devices 408 may include, for example, a display device, a keyboard, a mouse, etc.

Cloud Computing:

The system and techniques described above are applicable and useful in the upcoming cloud computing environment. Cloud computing means computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. The term "cloud" is intended to refer to the Internet and cloud computing allows shared resources, for example, software and information to be available, on-demand, like a public utility.

Typical cloud computing providers deliver common business applications online which are accessed from another web service or software like a web browser, while the software and data are stored remotely on servers. The cloud computing architecture uses a layered approach for providing application services. A first layer is an application layer that is executed at client computers. In this example, the application allows a client to access storage via a cloud.

After the application layer, is a cloud platform and cloud infrastructure, followed by a "server" layer that includes hardware and computer software designed for cloud specific services. The storage systems described above can be a part of the server layer for providing storage services. Details regarding these layers are not germane to the inventive embodiments.

Thus, a method and apparatus for initializing cloned virtual machines have been described. Note that references throughout this specification to "one embodiment" or "an embodiment" mean that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics being referred to may be combined as suitable in one or more embodiments of the invention, as will be recognized by those of ordinary skill in the art.

While the present disclosure is described above with respect to what is currently considered its preferred embodiments, it is to be understood that the disclosure is not limited to that described above. To the contrary, the disclosure is intended to cover various modifications and equivalent arrangements within the spirit and scope of the appended claims.

What is claimed is:

1. A machine implemented method for initializing a plurality of virtual machines sharing a physical storage unit managed by a storage system for storing a boot image used for initializing the plurality of virtual machines, comprising:
    obtaining a file block number and a unique signature for the physical storage unit storing the boot image for a first virtual machine from among the plurality of virtual machines;
    obtaining the boot image from the storage system managing the physical storage unit;
    storing the boot image at a cache memory of a virtual machine monitor that manages the plurality of virtual machines;
    initializing the first virtual machine using the boot image;
    generating a first data structure for storing the file block number and the unique signature;
    generating a second data structure for storing the unique signature and a memory address of the cache memory where the boot image is stored;
    obtaining file block numbers for remaining plurality of virtual machines besides the first virtual machine;
    updating the first data structure with the file block numbers for the remaining plurality of virtual machines and the unique signature;
    using the unique signature to obtain the address of the boot image stored at the cache memory for initializing the remaining plurality of virtual machines; and
    initializing the remaining plurality of virtual machines using the boot image from the cached memory.

2. The method of claim 1, wherein the virtual machine monitor virtualizes hardware resources and presents virtualized hardware resources to the plurality of virtual machines.

3. The method of claim 1, wherein the storage system at least uses a block as a storage unit to store the boot image and the block signature includes a physical address of the block and a unique identifier identifying a storage aggregate maintained by the storage system having a plurality of storage units.

4. The method of claim 1, wherein the first data structure and the second data structure are segments of a data structure maintained by the virtual machine monitor.

5. The method of claim 1, wherein the first data structure and the second data structure are independent data structures maintained by the virtual machine monitor.

6. The method of claim 1, wherein the virtual machine monitor and the plurality of virtual machines are executed on a same computing device that is accessible to a plurality of client computing systems.

7. The method of claim 1, wherein the virtual machine monitor and the plurality of virtual machines are executed on separate computing devices.

8. A system, comprising:
    a plurality of virtual machines managed by a virtualized machine monitor and sharing a physical storage unit for storing a boot image used for initializing the plurality of virtual machines; and
    a storage system managing the physical storage unit and interfacing with the virtual machine monitor via a network link;
    wherein to initialize a first virtual machine from among the plurality of virtual machines, the virtual machine monitor is configured to obtain a file block number, a unique signature for the physical storage unit and the boot image from the storage system; store the boot image at a cache memory of the virtual machine monitor; generate a first data structure for storing the file block number and the unique signature; generate a second data structure for storing the unique signature and a memory address of the cache memory where the boot image is stored; and
    wherein to initialize a remaining plurality of virtual machines besides the first virtual machine, the virtual machine monitor is configured to obtain file block numbers for the remaining plurality of virtual machines; update the first data structure with the file block numbers for the remaining plurality of virtual machines and the unique signature; use the unique signature to obtain the address of the boot image stored at the cache memory for initializing the remaining plurality of virtual machines; and initialize the remaining plurality of virtual machines using the boot image from the cached memory.

9. The system of claim 8, wherein the virtual machine monitor virtualizes hardware resources and presents virtualized hardware resources to the plurality of virtual machines.

10. The system of claim 8, wherein the storage system at least uses a block as a storage unit to store the boot image and the block signature includes a physical address of the block and a unique identifier identifying a storage aggregate maintained by the storage system having a plurality of storage units.

11. The system of claim 8, wherein the first data structure and the second data structure are segments of a data structure maintained by the virtual machine monitor.

12. The system of claim 8, wherein the first data structure and the second data structure are independent data structures maintained by the virtual machine monitor.

13. The system of claim 8, wherein the virtual machine monitor and the plurality of virtual machines are executed on a same computing device that is accessible to a plurality of client computing systems.

14. The system of claim 8, wherein the virtual machine monitor and the plurality of virtual machines are executed on separate computing devices.

15. A non-transitory, machine readable storage medium having stored thereon instructions for performing a method, comprising machine executable code which when executed by at least one machine, causes the machine to:

obtain a file block number and a unique signature for the physical storage unit storing the boot image for a first virtual machine from among the plurality of virtual machines;

obtain the boot image from the storage system managing the physical storage unit;

store the boot image at a cache memory of a virtual machine monitor that manages the plurality of virtual machines;

initialize the first virtual machine using the boot image;

generate a first data structure for storing the file block number and the unique signature;

generate a second data structure for storing the unique signature and a memory address of the cache memory where the boot image is stored;

obtain file block numbers for remaining plurality of virtual machines besides the first virtual machine;

update the first data structure with the file block numbers for the remaining plurality of virtual machines and the unique signature;

use the unique signature to obtain the address of the boot image stored at the cache memory for initializing the remaining plurality of virtual machines; and initialize the remaining plurality of virtual machines using the boot image from the cached memory.

16. The storage medium of claim 15, wherein the virtual machine monitor virtualizes hardware resources and presents virtualized hardware resources to the plurality of virtual machines.

17. The storage medium of claim 15, wherein the storage system at least uses a block as a storage unit to store the boot image and the block signature includes a physical address of the block and a unique identifier identifying a storage aggregate maintained by the storage system having a plurality of storage units.

18. The storage medium of claim 15, wherein the first data structure and the second data structure are segments of a data structure maintained by the virtual machine monitor.

19. The storage medium of claim 15, wherein the first data structure and the second data structure are independent data structures maintained by the virtual machine monitor.

20. The storage medium of claim 15, wherein the virtual machine monitor and the plurality of virtual machines are executed on a same computing device that is accessible to a plurality of client computing systems.

21. The storage medium of claim 15, wherein the virtual machine monitor and the plurality of virtual machines are executed on separate computing devices.

* * * * *